United States Patent
Sharon et al.

(10) Patent No.: US 9,116,824 B2
(45) Date of Patent: Aug. 25, 2015

(54) SYSTEM AND METHOD TO REDUCE READ LATENCY OF A DATA STORAGE DEVICE

(71) Applicant: SANDISK TECHNOLOGIES INC., Plano, TX (US)

(72) Inventors: Eran Sharon, Rishon Lezion (IL); Idan Alrod, Herzliya (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 223 days.

(21) Appl. No.: 13/838,662

(22) Filed: Mar. 15, 2013

(65) Prior Publication Data

US 2014/0281806 A1  Sep. 18, 2014

(51) Int. Cl.
*G11C 29/00*  (2006.01)
*G06F 12/00*  (2006.01)
*G06F 11/00*  (2006.01)
*G06F 11/10*  (2006.01)

(52) U.S. Cl.
CPC ..................................... *G06F 11/10* (2013.01)

(58) Field of Classification Search
None
See application file for complete search history.

(56) References Cited

U.S. PATENT DOCUMENTS

| | | | | |
|---|---|---|---|---|
| 6,804,750 | B2 * | 10/2004 | LaBerge | 711/154 |
| 8,661,218 | B1 * | 2/2014 | Piszczek et al. | 711/167 |
| 2003/0177300 | A1 | 9/2003 | Lee et al. | |
| 2004/0199738 | A1 | 10/2004 | Henriques et al. | |
| 2005/0005230 | A1 | 1/2005 | Koga et al. | |
| 2006/0126374 | A1 | 6/2006 | Waller et al. | |
| 2006/0221696 | A1 | 10/2006 | Li | |
| 2009/0316494 | A1 | 12/2009 | Uehara et al. | |
| 2010/0131827 | A1 * | 5/2010 | Sokolov et al. | 714/763 |
| 2014/0281161 | A1 * | 9/2014 | Chen et al. | 711/103 |
| 2014/0281588 | A1 * | 9/2014 | Vogan et al. | 713/193 |

OTHER PUBLICATIONS

International Search Report and Written Opinion of the International Searching Authority for International Application No. PCT/US2014/023475, mailed Oct. 10, 2014, 9 pages.

* cited by examiner

*Primary Examiner* — Justin R Knapp
(74) *Attorney, Agent, or Firm* — Toler Law Group, PC

(57) ABSTRACT

A data storage device includes a memory and a controller. The controller is configured to receive a read request that indicates a logical address. The controller is further configured to perform a first read operation to retrieve a representation of an entry of a logical mapping table from the memory, and perform a second read operation to retrieve a representation of a codeword from the memory. The controller is further configured to decode the representation of the codeword to determine whether an error exists at the entry, and, prior to completion of decoding, to initiate a third read operation to retrieve first read data from a first physical address corresponding to the logical address as determined based on the representation of the entry.

20 Claims, 3 Drawing Sheets

SYSTEM AND METHOD TO REDUCE READ LATENCY OF A DATA STORAGE DEVICE

FIELD OF THE DISCLOSURE

The present disclosure is generally related to reducing read latency.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. Although increasing the number of bits per cell and reducing device feature dimensions may increase a storage density of a memory device, a bit error rate of data stored at the memory device may also increase.

Random input/output operations per second (IOPS) performance has become one of the criteria by which memory products such as iNAND are compared. Page based Flash Management (FM) can improve performance during programming (e.g., for large number of programming IOPS). However, issuing Control Reads (CR) prior to data reads can reduce read performance when page based Flash Management is used.

For example, a CR may be used to identify a physical address of the data in the memory. The physical address may be stored in a logical-to-physical address mapping table in the memory. The logical-to-physical address mapping table may be too large (e.g. 1 MB table size per 1 GB of memory) to be kept as a whole at a controller of a flash memory device. As a result, during random read operations over a large span of read addresses, whenever a portion of the logical-to-physical address mapping table including a requested address is not cached in the controller, a CR may be issued to read the logical-to-physical address mapping table from the memory, resulting in increased overall read latency and reduced number of IOPS.

SUMMARY

Data is read from a data storage device in a manner that reduces read latency. In particular, when a read request indicating a logical address is received at the data storage device from a host device, a controller of the data storage device may determine whether a portion of a table mapping the logical address to a physical address is stored at the controller. If the portion of the table is not stored at the controller, the controller may perform a first read operation to retrieve a representation of an entry of a logical mapping table from a memory and perform a second read operation to retrieve a representation of a codeword from the memory, where the codeword includes the entry of the logical mapping table. The controller may decode the representation of the codeword to determine whether an error exists at the entry, and prior to completion of decoding the representation of the codeword, initiates a third read operation to retrieve first read data from a first physical address corresponding to the logical address as determined based on the representation of the entry. If the decoding indicates that no error exists at the entry, then the first read data retrieved from the first physical address may be provided to the host. If the decoding indicates that an error exists at the entry, the controller may initiate a fourth read operation to retrieve second read data from a second physical address correspond to the logical address as determined based on the error-corrected entry in the decoded codeword. Thus, read latency may be reduced when the entry does not include an error since the decoding to determine whether the entry includes an error is performed concurrently with a read of the first physical address. Read latency may be neither reduced nor increased when the entry does include an error. Accordingly, average read latency of the memory device is reduced.

DETAILED DESCRIPTION

Figure 1:
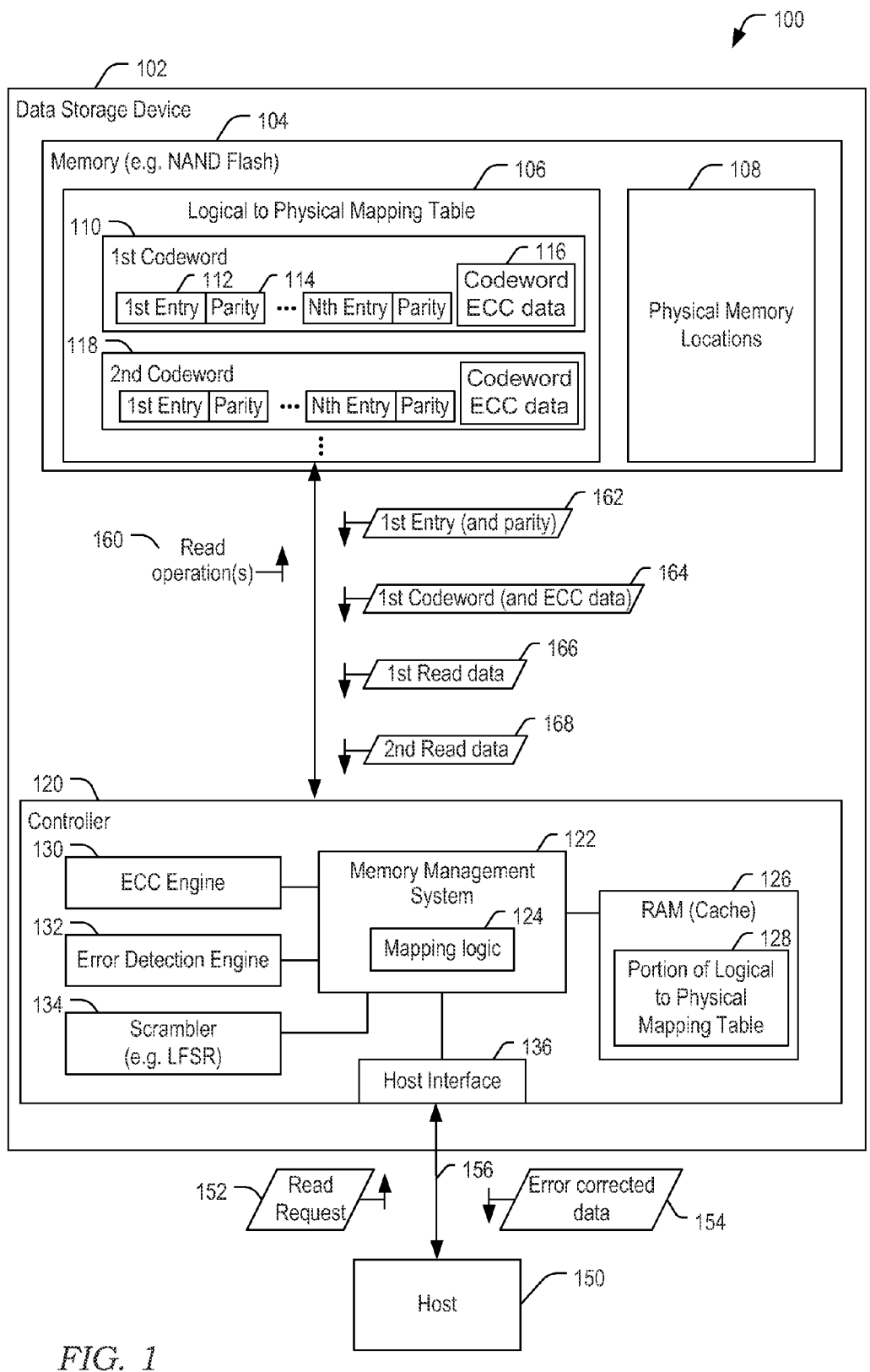
FIG. 1 is a block diagram of a particular illustrative embodiment of a system including a data storage device configured to reduce read latency.

Referring to FIG. 1, a particular illustrative embodiment of a system including a data storage device 102 configured to reduce read latency is depicted and generally designated 100. The system 100 includes the data storage device 102 coupled to a host device 150 via a bus 156. The data storage device 102 includes a memory 104 coupled to a controller 120. The controller 120 is configured to read data from the memory in a manner that reduces read latency.

The memory 104 may be a non-volatile memory, such as a NAND flash memory. The memory 104 includes a group of storage elements, such as a word line of a multi-level cell (MLC) flash memory. The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 150 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The host device 150 may be configured to provide data to be stored at the memory 104 and/or to request data to be read from the memory 104. For example, the host device 150 may include a mobile telephone, a music player, a video player, a gaming console, an electronic book reader, a personal digital assistant (PDA), a computer, such as a laptop computer, a notebook computer, or a tablet, any other electronic device, or any combination thereof. The host device 150 communicates via a memory interface that enables reading from the memory 104 and writing to the memory 104. For example, the host device 150 may operate in compliance with a Joint Electron Devices Engineering Council (JEDEC) industry specification, such as a Universal Flash Storage (UFS) Host Controller Interface specification. As other examples, the host device 150 may operate in compliance with one or more other specifications, such as a Secure Digital (SD) Host Controller specification as an illustrative example. The host device 150 may communicate with the memory 104 in accordance with any other suitable communication protocol.

The memory 104 may be a non-volatile memory of a flash device, such as a NAND flash device, a NOR flash device, or any other type of flash device. The memory 104 includes physical memory locations 108 and a logical to physical mapping table 106. The logical to physical mapping table 106 includes a plurality of entries, such as a representative first entry 112. Each entry of the plurality of entries maps a particular logical address to a corresponding physical address of one of the physical memory locations 108. The entries may be grouped into sets of entries, such as a first set of entries corresponding to a first codeword 110 and a second set of entries corresponding to a second codeword 118. Each codeword 110, 118 may be associated with or may include error correction data, such as representative codeword error correcting-code (ECC) data 116 associated with the first codeword 110. In a particular embodiment, each of the entries may also be associated with error detection data, such as representative parity data 114 associated with the first entry 112.

The controller 120 includes a memory management system 122 that is configured to perform memory management functions, such as sending data to and receiving data from various components of the controller 120 and coordinating operation of the various components of the controller 120. The memory management system 122 may include mapping logic 124 that is configured to use logical to physical mapping information to map logical addresses received from the host device 150 to physical addresses corresponding to the physical memory locations 108 of the memory 104. To map the logical addresses to the physical addresses, the mapping logic 124 may access a memory of the controller 120, such as a random access memory (RAM) 126, that stores a portion 128 of the logical to physical mapping table 106. In a particular embodiment, the RAM 126 may too small to store the entire the logical to physical mapping table 106. Accordingly, a caching process, such as first-in-first-out caching or another caching process may determine the portion 128 of the logical to physical mapping table 106 that is stored at the RAM 126.

The controller 120 may also include an ECC engine 130. The ECC engine 130 is configured to decode codewords retrieved from the memory 104 using codeword ECC data. For example, when a representation 164 of the first codeword 110 is retrieved from the memory 104, the ECC engine 130 may decode the representation 164 of the first codeword 110 to identify and correct errors. To illustrate, the ECC engine 130 may use BCH error correction code, Hamming error correction code, Reed-Solomon error correction code, or another error correction code to detect and correct errors in the retrieved codewords.

The controller 120 may also include an error detection engine 132. The error detection engine 132 is configured to detect errors in entries retrieved from the memory 104. While the error detection and correction performed by the ECC engine 130 may relatively complex (e.g., capable of identifying and correcting errors in an entire codeword), the error detection performed by the error detection engine 132 may be significantly less complex. For example, the error detection engine 132 may perform a parity check for a single entry retrieved from the memory 104, such as by determining whether the entry includes an odd or even number of one values. Thus, error detection by the error detection engine 132 may be significantly faster than error detection and correction by the ECC engine 130.

In a particular embodiment, when the entries or codewords are scrambled before they are stored at the memory 104, the controller 120 may include a scrambler 134 (such as a linear feedback shift register (LFSR)) to descramble entries retrieved from the memory 104.

The controller 120 may be configured to receive data and instructions from and to send data to the host device 150 while the data storage device 102 is operatively coupled to the host device 150 via a host interface 136 and a bus 156. The controller 120 is further configured to send data and commands to the memory 104 and to receive data from the memory 104. For example, the controller 120 is configured to send data and a write command to instruct the memory 104 to store the data. As another example, the controller 120 is configured to send a read command to implement a read operation to read data from a specified physical address of the memory 104.

During operation, the controller 120 may receive a read request 152 from the host device 150. The read request 152 may indicate a logical address of data to be provided to the host device 150. The controller 120, using the mapping logic 124, may determine a physical address of a particular physical memory location that corresponds to the logical address. When the portion 128 of the logical to physical mapping table 106 stored at the RAM 126 includes the logical address indicated by the read request 152, the controller 120 can determine the physical address without accessing the logical to physical mapping table 106 from the memory 104. However, when the portion 128 of the logical to physical mapping table 106 stored at the RAM 126 does not include the logical address indicated by the read request 152, the controller 120 performs a read operation 160 to read a portion of the logical to physical mapping table 106 (such as the first codeword 110) that includes the logical address. To reduce read latency, the controller 120 also performs a read operation 160 to read a particular entry (such as the first entry 112) of the logical to physical mapping table 106 that corresponds to the logical address.

In a particular embodiment, a single read operation (e.g., a single sensing operation) may be used to read the first codeword 110 and the first entry 112 to be transferred to the controller 120 as separate chunks of data. For example, the first codeword 110 may correspond to approximately 4 kilobytes (KB) of data, and the first entry 112 may correspond to approximately 4 bytes of data. To illustrate, a single sensing operation of approximately 50 µs may be performed. A first chunk of data may be retrieved (e.g., in less than 1 µs) including a representation (e.g., representation 162) of the 4 bytes of first entry 112. Subsequently, a second chunk of data may be retrieved (e.g., about 20 µs using a 200 MB/s bus) including a representation (e.g., representation 164) of the 4 KB of the first codeword 110.

In a particular embodiment, a third read operation (e.g., a second sensing operation) may be initiated after the representation 162 of the first entry 112 is transferred to the controller 120. The third read operation may be initiated immediately upon receipt of the representation 162 of the first entry 112, or after performing error detection and/or descrambling of the representation 162 of the first entry 112. In particular, the third read operation may be initiated prior to the representation 164 of the first codeword 110 being received at the controller 120 (e.g., before the approximately 20 µs transfer operation associated with the representation 164 of the first codeword 110 has begun or has completed). In this embodiment, decoding the representation 164 of the first codeword 110 may take about 10 μs. Accordingly, by initiating the third read operation without waiting for retrieval and decoding of the representation 164 of the first codeword 110, approximately 30 μs can be saved (e.g., about 20 μs to retrieve the 4 KB of the representation 164 of the first codeword 110 and about 10 μs to decode the representation 164 of the first codeword 110).

In response the read operations 160, the controller 120 may receive the representation 162 of the first entry 112 and may receive the representation 164 of the first codeword 110. The representation 164 of the first codeword 110 may include the codeword ECC data 116 associated with the first codeword 110. The memory management system 122 may provide the representation 164 of the first codeword 110 to the ECC engine 130 to begin decoding the first codeword 110.

While the ECC engine 130 is decoding the first codeword 110, the controller 120 may initiate a read operation based on the representation 162 of the first entry 112. When the representation 162 of the first entry 112 includes error detection data (such as a parity bit), the error detection engine 132 may determine whether the representation 162 of the first entry 112 includes an error that is detectable based on the error detection data. Additionally, if the representation 162 of the first entry 112 is scrambled, the scrambler 134 may descramble the representation 162 of the first entry 112. If no error is detected by the error detection engine 132 (e.g., parity calculated based on the representation 162 of the first entry 112 matches the parity bit), the controller 120 may initiate a read operation 160 to retrieve first read data 166 from a first physical address corresponding to the logical address as determined based on the representation 162 of the first entry 112.

When the ECC engine 130 completes decoding of the representation 164 of the first codeword 110, the memory management system 122 may determine whether to discontinue the read operation to retrieve first read data 166 (or to discard the first read data 166). For example, when the ECC engine 130 determines that there is an error at the first entry 112, the read operation to retrieve first read data 166 may be discontinued or the first read data 166 may be discarded, since the error at the first entry may indicate that the first read data 166 is not associated with the physical address that includes the data sought by the read request 152.

Additionally, when the ECC engine 130 determines that there is an error at the first entry 112, the controller 120 may initiate another read operation 160 to retrieve second read data 168 from a second physical address corresponding to the logical address as determined based on the first entry 112 in the decoded codeword. For example, the ECC engine 130 may correct the identified error and provide an error corrected entry (or an error corrected codeword) to the memory management system 122. The mapping logic 124 of the memory management system 122 may identify the second physical address based on the error corrected entry or the error corrected codeword.

Since transfer of the representation 164 of the first codeword 110 and the decode operation performed by the ECC engine 130 may be relatively slow (and are unnecessary when no error exists at a particular entry), read latency of the data storage device 102 may be reduced by retrieving data from a physical address determined based on the representation 162 of the first entry 112 while the representation 164 of the first codeword 110 is received and while the ECC engine 130 performs the decode operation to confirm that the physical address is correct. If the ECC engine 130 determines that the physical address is correct, the data retrieved from the physical address (e.g., the first read data 166) may be provided to the host device 150. If the ECC engine 130 determines that the physical address is not correct (e.g., there is an error in the entry 112), the data retrieved from the physical address (e.g., the first read data 166) may be discarded and another read operation may be performed based on the correct physical address (e.g., to retrieve the second read data 168).

In a particular embodiment, a potential error in the representation 162 of the first entry 112 may be detected by comparing a logical address indicated by the representation 162 of the first entry 112 to the logical address requested by the host device 150. For example, the first entry 112 may include metadata indicating a logical address to which a physical address indicated by the first entry 112 corresponds. After receiving the representation 162 of the first address 112, the controller 120 may compare a logical address determined based on the representation 162 of the first address 112 to the logical address requested by the host device 150. If the logical address determined based on the representation 162 of the first address 112 does not match the logical address requested by the host device 150, the data retrieved from the physical address (e.g., the first read data 166) indicated by the representation 162 of the first address 112 may be discarded and another read operation may be performed based on the correct physical address (e.g., to retrieve the second read data 168).

As a specific example, a particular control read scheme may add up to about 80 microseconds (μs) of read latency (excluding firmware overhead). Read latency for such a device may be broken down approximately as: 50 μs for sense latency, 20 μs for transfer latency (e.g., assuming a 4 KB codeword size at 200 MB/s, as in the example above), and 10 μs for decode latency (plus latency due to firmware overhead). Embodiments disclosed herein enable reducing latency by avoiding transfer and decoding of an entire codeword (which may consume approximately 30 μs) and by reducing firmware overhead associated with issuing two read commands (one for control and one for data). Hence, overall control read latency may be reduced by up to about 40 percent (i.e., from about 80 μs to about 50 μs) by initiating the third read operation based on the representation 162 of the first entry 112 without waiting for the controller 120 to receive the representation 164 of the first codeword 110 and decode the representation 164 of the first codeword 110. In a random read scenario, random input/output operations per second (IOPS) may be improved by up to about 20 percent.

Figure 2:
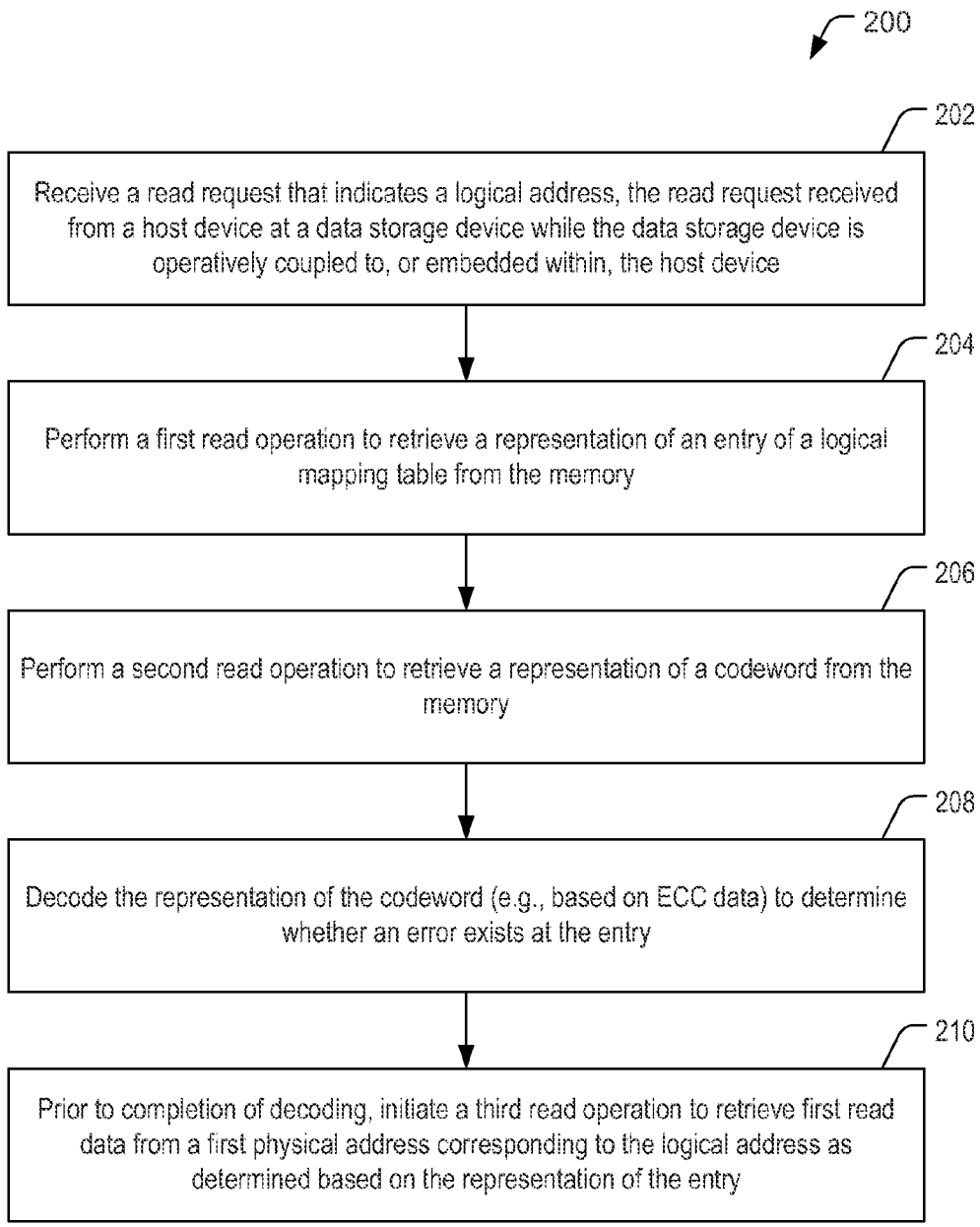
FIG. 2 is a flow chart of a first particular illustrative embodiment of a method of reading data from a data storage device with reduced read latency.

FIG. 2 depicts a flow chart of a first particular illustrative embodiment of a method 200 of reading data from a data storage device with reduced read latency. The method 200 may be performed by a data storage device, such as the data storage device 102 of FIG. 1.

At 202, a read request is received that indicates a logical address. The read request may be received from a host device while the data storage device is operatively coupled to, or embedded within, the host device. For example, the read request may be received by the data storage device 102 of FIG. 1 from the host device 150, while the data storage device 102 is operative coupled to or embedded within the host device 150.

At 204, a first read operation may be performed to retrieve a representation of an entry of a logical mapping table from the memory. For example, the controller 120 of FIG. 1 may perform a first read operation to retrieve the representation 162 of the first entry 112 from the logical to physical mapping table 106 of the memory 104.

At 206, a second read operation may be performed to retrieve a representation of a codeword from the memory. The codeword may include the entry of the logical mapping table. For example, the controller 120 of FIG. 1 may perform a second read operation to retrieve the representation 164 of the codeword 110 that includes the first entry 112. The representation 164 of the codeword 110 may be retrieved from the logical to physical mapping table 106 of the memory 104.

At 208, the representation of the codeword may be decoded to determine whether an error exists at the entry. At 210, prior to completion of decoding, a third read operation may be initiated to retrieve first read data from a first physical address corresponding to the logical address as determined based on the representation of the entry. For example, the memory management system 122 of the controller 120 of FIG. 1 may provide the representation 164 of the codeword 110 to the ECC engine 130 to decode the representation 164 of the codeword 110. While the ECC engine 130 is decoding the representation 164 of the codeword 110, the memory management system 122 may issue a read operation to read data from a physical memory location corresponding to a physical address determined based on the representation 162 of the first entry 112.

Since a decode operation performed by an ECC engine may be relatively slow and is often unnecessary (i.e., when no error exists at a particular entry), read latency of the data storage device may be reduced by retrieving data from a physical address determined based on the particular entry while the ECC engine performs the decode operation to confirm that the physical address is correct. If the ECC engine determines that the physical address is correct, the data retrieved from the physical address may be provided to the host device. If the ECC engine determines that the physical address is not correct (e.g., there is an error in the entry), the data retrieved from the physical address may be discarded and another read operation may be performed based on the correct physical address.

Figure 3:
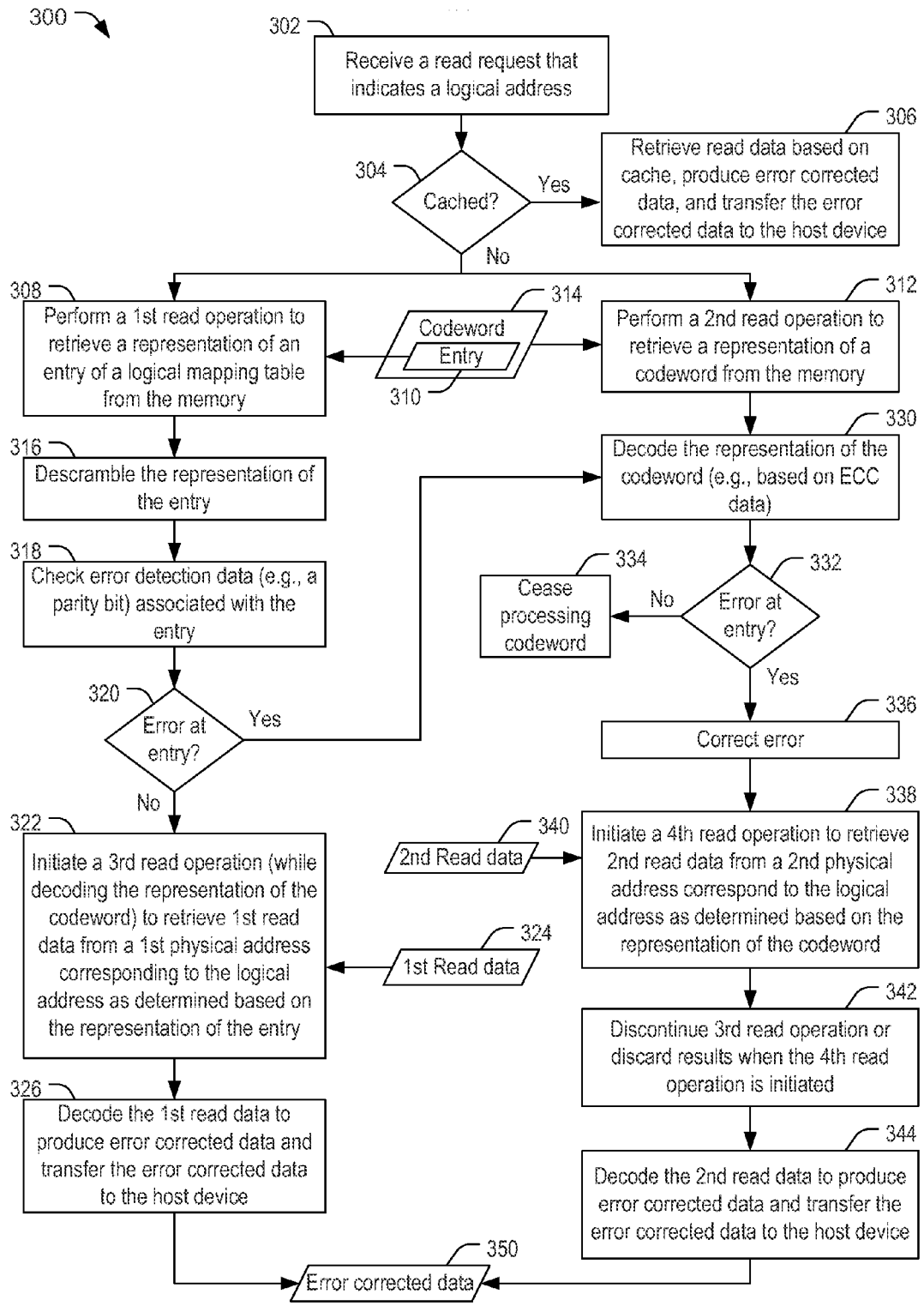
FIG. 3 is a flow chart of a second particular illustrative embodiment of a method of reading data from a data storage device with reduced read latency.

FIG. 3 depicts a flow chart of a first particular illustrative embodiment of a method 300 of reading data from a data storage device with reduced read latency. The method 300 may be performed by a data storage device, such as the data storage device 102 of FIG. 1.

At 302, a read request is received that indicates a logical address. The read request may be received from a host device while the data storage device is operatively coupled to, or embedded within, the host device. For example, the read request may be received by the data storage device 102 of FIG. 1 from the host device 150, while the data storage device 102 is operative coupled to or embedded within the host device 150.

At 304, a controller of the data storage device may determine whether a portion of a logical mapping table at the controller includes the logical address (e.g., whether the portion of the logical mapping table is cached at the controller). For example, the controller 120 of FIG. 1 may determine whether the portion 128 of the logical to physical mapping table 106 stored at the RAM 126 includes the logical address. When the portion of the logical mapping table at the controller includes the logical address, the controller may, at 306, retrieve read data based on the portion of the logical mapping table at the controller (e.g., based on the cache), produce error corrected data, and transfer the error corrected data to the host device.

When the portion of the logical mapping table at the controller does not include the logical address, the controller may perform additional read operations. In particular, at 308, a first read operation may be performed to retrieve a representation 310 of an entry of a logical mapping table from the memory, and, at 312, a second read operation may be performed to retrieve a representation 314 of a codeword from the memory. The codeword may include the entry of the logical mapping table. For example, the controller 120 of FIG. 1 may perform the first read operation to retrieve the representation 162 of the first entry 112 from the logical to physical mapping table 106 of the memory 104. The controller 120 may also perform a second read operation to retrieve the representation 164 of the codeword 110 that includes the first entry 112. The representation 164 of the codeword 110 may be retrieved from the logical to physical mapping table 106 of the memory 104.

At 316, when the representation 310 of the entry is scrambled, the representation of the entry may be descrambled. For example, after the representation 162 of the entry 112 of FIG. 1 is received, the memory management system 122 may provide the representation 162 of the entry 112 to the scrambler 134 to descramble the representation 162 of the entry 112.

In a particular embodiment, the method 300 may include, at 318, checking error detection data, such as a parity bit, associated with the entry. For example, after the representation 162 of the entry 112 of FIG. 1 is received, the memory management system 122 may provide the representation 162 of the entry 112 and its associated parity data to the error detection engine 132. The error detection engine 132 may determine whether the representation 162 of the entry 112 includes an error based on the error detection data.

At 320, when the error detection data indicates that the representation of the entry includes at least one error, the method 300 may cease processing the representation of the entry. For example, the method 300 may decode the representation of the codeword, at 330. At 320, when the error detection data does not indicate that the representation of the entry includes an error, a third read operation may be initiated to retrieve first read data 324 from a first physical address corresponding to the logical address as determined based on the representation of the entry, at 322. In a particular embodiment, the third read operation is performed while the representation of the codeword is decoded. For example, after the representation 162 of the entry 112 and the representation 164 of the codeword 110 are received at the controller 120, the memory management system 122 may send the representation 164 of the codeword 110 to the ECC engine 130 to be decoded and may perform a read operation to read a physical memory location identified by a physical address determined based on the representation 162 of the entry 112. Thus, data may be retrieved from the physical memory location identified by the physical address determined based on the representation 162 of the entry 112 during a time period that overlaps with (e.g., is concurrent with) decoding of the representation 164 of the codeword 110 to confirm the physical address.

At 326, after the first read data 324 is retrieved, and if no error in the entry is identified, the first read data 324 may be decoded to produce error corrected data 350. The error corrected data 350 may be provided to the host device.

At 330, after the representation of the codeword is retrieved, the representation of the codeword may be decoded. For example, ECC data associated with the codeword may be used to identify and correct errors in the representation of the codeword. To illustrate, after the representation 164 of the codeword 110 is retrieved by the controller 120 of FIG. 1, the ECC engine 130 may decode the representation 164 of the codeword 110.

When no error is detected in the entry, at 332, the method 300 may cease processing the codeword 334. When the decoding process determines that the representation of the entry does not include errors, the first physical address associated with the first read data 324 is correct, and no further processing of the codeword is needed. Alternately, a decoded and error corrected representation of the codeword may be stored in a memory of the controller (e.g., as a cached portion of the logical to physical mapping table) to expedite locating physical addresses of subsequent read requests.

When an error is detected in the entry, at 332, the error may be corrected, at 336. At 338, a fourth read operation may be initiated to retrieve second read data 340 from a second physical address. The second physical address corresponds to the logical address as determined based on the representation of the codeword after the error is corrected. For example, after the ECC engine 130 detects an error in the entry 112, the memory management system 122 may perform a read operation to retrieve the second read data 168. The second read data 168 may be retrieved from a physical memory location identified by an error corrected version of the entry 112 determined by the ECC engine 130.

At 342, the third read operation may be discontinued or results of the third read operation may be discarded when the fourth read operation is initiated. For example, when the memory management system 122 of FIG. 1 issues the fourth read operation, the first read data 166 may be discarded.

At 344, after the second read data 340 is retrieved, the second read data 340 may be decoded to produce error corrected data 350. The error corrected data 350 may be provided to the host device.

Since a decode operation performed by an ECC engine may be relatively slow and is often unnecessary (e.g., when no error exists at the particular entry), read latency of the data storage device may be reduced by retrieving data from a physical address determined based on the particular entry while the ECC engine performs the decode operation to confirm that the physical address is correct. If the ECC engine determines that the physical address is correct, the data retrieved from the physical address may be provided to the host device. If the ECC engine determines that the physical address is not correct (e.g., there is an error in the entry), the data retrieved from the physical address may be discarded and another read operation may be performed based on the correct physical address.

Although various components depicted herein are illustrated as block components and described in general terms, such components may include one or more microprocessors, state machines, or other circuits configured to reduced latency by retrieving data from a physical address determined based on the particular entry while the ECC engine performs a decode operation to confirm that the physical address is correct.

In a particular embodiment, the data storage device 102 may be implemented in a portable device configured to be selectively coupled to one or more external devices. However, in other embodiments, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular embodiment, the data storage device 102 may be coupled to a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a data storage device that includes a memory and a controller performing:
   receiving a read request that indicates a logical address, the read request received from a host device while the data storage device is operatively coupled to, or embedded within, the host device;
   performing a first read operation to retrieve, from the memory, a representation of an entry of a logical mapping table that corresponds to the logical address;
   performing a second read operation to retrieve a representation of a codeword from the memory, wherein the representation of the codeword includes the representation of the entry;
   decoding the representation of the codeword to determine whether an error exists at the entry; and
   prior to completion of decoding, initiating a third read operation to retrieve first read data from a first physical address corresponding to the logical address as determined based on the representation of the entry.

2. The method of claim 1, further comprising, after retrieving the first read data, decoding the first read data to produce error corrected data and transferring the error corrected data to the host device.

3. The method of claim 1, further comprising, when decoding the representation of the codeword identifies an error at the entry, initiating a fourth read operation to retrieve second read data from a second physical address corresponding to the logical address as determined based on a corrected representation of the codeword.

4. The method of claim 3, wherein the third read operation is discontinued when the fourth read operation is initiated.

5. The method of claim 3, wherein results of the third read operation are discarded if the fourth read operation is initiated.

6. The method of claim 3, further comprising, after retrieving the second read data, decoding the second read data to produce error corrected data and transferring the error corrected data to the host device.

7. The method of claim 1, further comprising determining whether a portion of the logical mapping table that is in the controller includes the logical address.

8. The method of claim 1, further comprising, after retrieving the representation of the entry, checking error detection data associated with the entry, wherein the third read operation is initiated when the error detection data does not indicate an error in the representation of the entry.

9. The method of claim 8, wherein the error detection data includes a parity bit associated with the entry, and wherein the representation of the codeword is decoded based on error detection and correction data associated with the codeword.

10. The method of claim 1, further comprising, after retrieving the representation of the entry, descrambling the representation of the entry before initiating the third read operation.

11. A data storage device comprising:
a memory; and
a controller coupled to the memory, wherein the controller includes a first logical mapping table and is configured to:
receive a read request that indicates a logical address, the read request received from a host device while the data storage device is operatively coupled to, or embedded within, the host device;
perform a first read operation to retrieve, from the memory, a representation of an entry of a logical mapping table that corresponds to the logical address;
perform a second read operation to retrieve a representation of a codeword from the memory, the representation of the codeword including the representation of the entry;
decode the representation of the codeword to determine whether an error exists at the entry; and
prior to completion of decoding, initiate a third read operation to retrieve first read data from a first physical address corresponding to the logical address as determined based on the representation of the entry.

12. The data storage device of claim 11, wherein the controller is configured to, after retrieving the first read data, decode the first read data to produce error corrected data and transfer the error corrected data to the host device.

13. The data storage device of claim 11, wherein the controller is configured to, when decoding the representation of the codeword identifies an error at the entry, initiate a fourth read operation to receive second read data from a second physical address corresponding to the logical address as determined based on a corrected representation of the codeword.

14. The data storage device of claim 13, wherein the controller is configured to discontinue the third read operation when the fourth read operation is initiated.

15. The data storage device of claim 13, wherein the controller is configured to discard results of the third read operation if the fourth read operation is initiated.

16. The data storage device of claim 13, wherein the controller is configured to, after retrieving the second read data, decode the second read data to produce error corrected data and transfer the error corrected data to the host device.

17. The data storage device of claim 11, wherein the controller is configured to determine whether a portion of the logical mapping table that is in the controller includes the logical address.

18. The data storage device of claim 11, wherein the controller is configured to, after retrieving the entry, check error detection data associated with the entry, wherein the third read operation is initiated when the error detection data does not indicate an error in the representation of the entry.

19. The data storage device of claim 18, wherein the error detection data includes a parity bit associated with the entry, and wherein the representation of the codeword is decoded based on error detection and correction data associated with the codeword.

20. The data storage device of claim 11, wherein the controller is configured to, after retrieving the representation of the entry, descramble the representation of the entry before initiating the third read operation.

* * * * *